United States Patent [19]

Koseki

[11] Patent Number: 5,481,424
[45] Date of Patent: Jan. 2, 1996

[54] RECORDING HEAD APPARATUS FOR A TAPE PLAYER

[75] Inventor: Shuji Koseki, Tokyo, Japan

[73] Assignee: Sony Corporation, Tokyo, Japan

[21] Appl. No.: 298,373

[22] Filed: Aug. 30, 1994

Related U.S. Application Data

[63] Continuation of Ser. No. 59,679, May 12, 1993, abandoned.

[30] Foreign Application Priority Data

May 20, 1992 [JP] Japan .................................. 4-152795

[51] Int. Cl.⁶ .............................. G11B 5/55; G11B 5/54
[52] U.S. Cl. ........................................ 360/106; 360/105
[58] Field of Search ................................. 360/105, 106, 360/109, 118

[56] References Cited

U.S. PATENT DOCUMENTS

| | | | |
|---|---|---|---|
| 4,302,788 | 11/1981 | Yamamoto | 360/96.6 |
| 4,319,293 | 3/1982 | Tomabechi | 360/105 |
| 4,532,565 | 7/1985 | Tomita | 360/106 |
| 4,597,024 | 6/1986 | Kurafuzi et al. | 360/105 |
| 4,636,895 | 1/1987 | Tomita | 360/105 |
| 4,638,385 | 1/1987 | Kohri | 360/106 |
| 4,646,187 | 2/1987 | Tomita et al. | 360/130.21 |
| 5,018,034 | 5/1991 | Tanaka et al. | 360/106 |

FOREIGN PATENT DOCUMENTS

| | | | |
|---|---|---|---|
| 2233811 | 1/1973 | Germany | 360/118 |
| 59-175016 | 10/1984 | Japan . | |
| 60-115019 | 6/1985 | Japan | 360/106 |
| 60-150224 | 12/1985 | Japan . | |
| 61-22414 | 1/1986 | Japan | 360/106 |
| 61-22413 | 1/1986 | Japan | 360/106 |
| 1232512 | 9/1989 | Japan | 360/106 |

*Primary Examiner*—Stuart S. Levy
*Assistant Examiner*—William J. Klimowicz
*Attorney, Agent, or Firm*—Jay H. Maioli

[57] ABSTRACT

A recording and reproducing apparatus includes a head supporting member supported on a head slider and having a first head holder for supporting a recording and reproducing head and a second head holder for slidably supporting an erase head so that the erase head can be moved linearly and independently of the recording and reproducing head. The head supporting member is rotatable to reverse the orientation of the recording and reproducing head and of the erase head in accordance with a switching operation that reverses the travel direction of the tape. A record button is attached to a record lever that engages a recording operation slide member when the record button is depressed to release the recording operation slide member from holding the erase head away from a contact surface of the tape.

5 Claims, 9 Drawing Sheets

RECORDING HEAD APPARATUS FOR A TAPE PLAYER

This is a continuation of application Ser. No. 08/059,679 filed May 12, 1993, now abandoned.

BACKGROUND OF THE INVENTION

1. Field of the Invention

The present invention generally relates to recording and reproducing apparatus and, more particularly, to a recording and reproducing apparatus having an auto-reverse function in which a recording and reproducing head and an erase head are both of reversible types.

2. Description of the Relevant Art

One conventional recording and reproducing apparatus that can record or reproduce a tape while the tape is transported in the positive and reverse directions is generally referred to as an auto-reverse recording and reproducing apparatus. According to the auto-reverse function, the tape can be automatically recorded or reproduced while the tape is transported in the positive direction during the tape loading state and the operation unit setting condition need not be changed at all when the tape reaches its end. Also, while the tape is transported in the reverse direction, the tape can be recorded or reproduced automatically. Therefore, the auto-reverse function is useful particularly when recording or reproduction of a long time is required.

As a recording and reproducing apparatus having the above auto-reverse function, there is known a so-called combination head in which a recording and reproducing head and an erase head are constructed integrally. Japanese published utility model publication No. 63-31213 describes this type of head in which the erase head is reversed by 180° together with the recording and reproducing head in order to switch the erasing direction.

Another conventional auto-reverse recording and reproducing apparatus utilizes a four-channel recording and reproducing head whose erase heads are opposed to small windows of a cassette half.

The former recording and reproducing apparatus employs the erase head of a coil-type head utilizing an AC bias. Such coil-type erase head is expensive and the erase head must be disposed in a limited small space. Therefore, if the tape is curled at the guide portion when a tape path of the head is adjusted, then the state that the tape is in contact with the erase head is affected. There is then the problem that the tape is not erased completely. The latter recording and reproducing apparatus needs two erase heads and therefore becomes expensive. Also, because characteristics of the two erase heads are not the same, erasing characteristics that the two erase heads present while the tape is transported in the positive direction and in the reverse direction are fluctuated. Furthermore, the number of tape guides is increased as the number of erase heads is increased. There is then the problem that adjustment the tape path becomes troublesome.

OBJECTS AND SUMMARY OF THE INVENTION

Therefore, it is an object of the present invention to provide an improved recording and reproducing apparatus in which the aforesaid shortcomings and disadvantages encountered with the prior art can be eliminated.

More specifically, it is an object of the present invention to provide a recording and reproducing apparatus in which a tape can be recorded and reproduced both in the positive and reverse direction by utilizing a single erase head.

It is another object of the present invention to provide a recording and reproducing apparatus in which erase characteristics that an erase head presents when a tape is transported in the positive direction and in the reverse direction can be prevented from being fluctuated.

It is a further object of the present invention to provide a recording and reproducing apparatus in which the number of erase heads can be minimized.

It is still a further object of the present invention to provide a recording and reproducing apparatus in which the number of tape guides can be minimized.

It is still a further object of the present invention to provide a recording and reproducing apparatus in which a tape path can be adjusted with ease.

It is yet a further object of the present invention to provide a recording and reproducing apparatus which can be produced inexpensively.

According to a first aspect of the present invention, there is provided a recording and reproducing apparatus which comprises a positive and reverse switching member for switching a travel direction of a tape so that the tape is transported at a constant speed in the positive direction or in the reverse direction, a head slider sliding between a recordable or reproducible first position at which a recording and reproducing head and an erase head are brought in contact with the tape and a second position at which the recording and reproducing head and the erase head are moved away from the tape in a ganged relation with a switching operation of the positive and reverse switching member, a head supporting member supported on the head slider for supporting the recording and reproducing head and the erase head so that tape contact surfaces of the recording and reproducing head and the erase head are projected, and a reverse member for reversing the head supporting member in a ganged relation with the switching operation of the positive and reverse switching means under the condition that the tape contact surfaces of the recording and reproducing head and the erase head are spaced from the tape in an opposing fashion so that the recording and reproducing head and the erase head are reversed at two positions corresponding to the positions at which the tape is transported at a constant speed in the positive direction and in the reverse direction, wherein the erase head is supported by the head supporting member so that the erase head can be moved in the direction in which it is moved away from the tape.

In accordance with a second aspect of the present invention, there is provided a recording and reproducing apparatus which comprises a positive and reverse switching member for switching a travel direction of a tape so that the tape is transported at a constant speed in the positive direction or in the reverse direction, a head slider sliding between a recordable or reproducible first position and a second position which is away from the tape, a head supporting member supported on the head slider for supporting a recording and reproducing head and an erase head so that tape contact surfaces of the recording and reproducing head and the erase head are projected, and a reverse member for reversing the head supporting member in a ganged relation with the switching operation of the positive and reverse switching member under the condition that the tape contact surfaces of the recording and reproducing head and the erase head are spaced from said tape in an opposing fashion so that the recording and reproducing head and the erase head are reversed at two positions corresponding to the positions at which the tape is transported at a constant speed in the positive direction and in the reverse direction, and a recording operation slide member which can be slid only when a recording mode is set, wherein the head supporting member supports the erase head so that the erase head can be moved away from the tape and the recording operation slide member holds the erase head at the position distant from the tape when the head slider is set in a reproducing mode and moved to the recordable or reproducible first position.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

A recording and reproducing apparatus according to an embodiment of the present invention will hereinafter be described with reference to the drawings.

Figure 1:
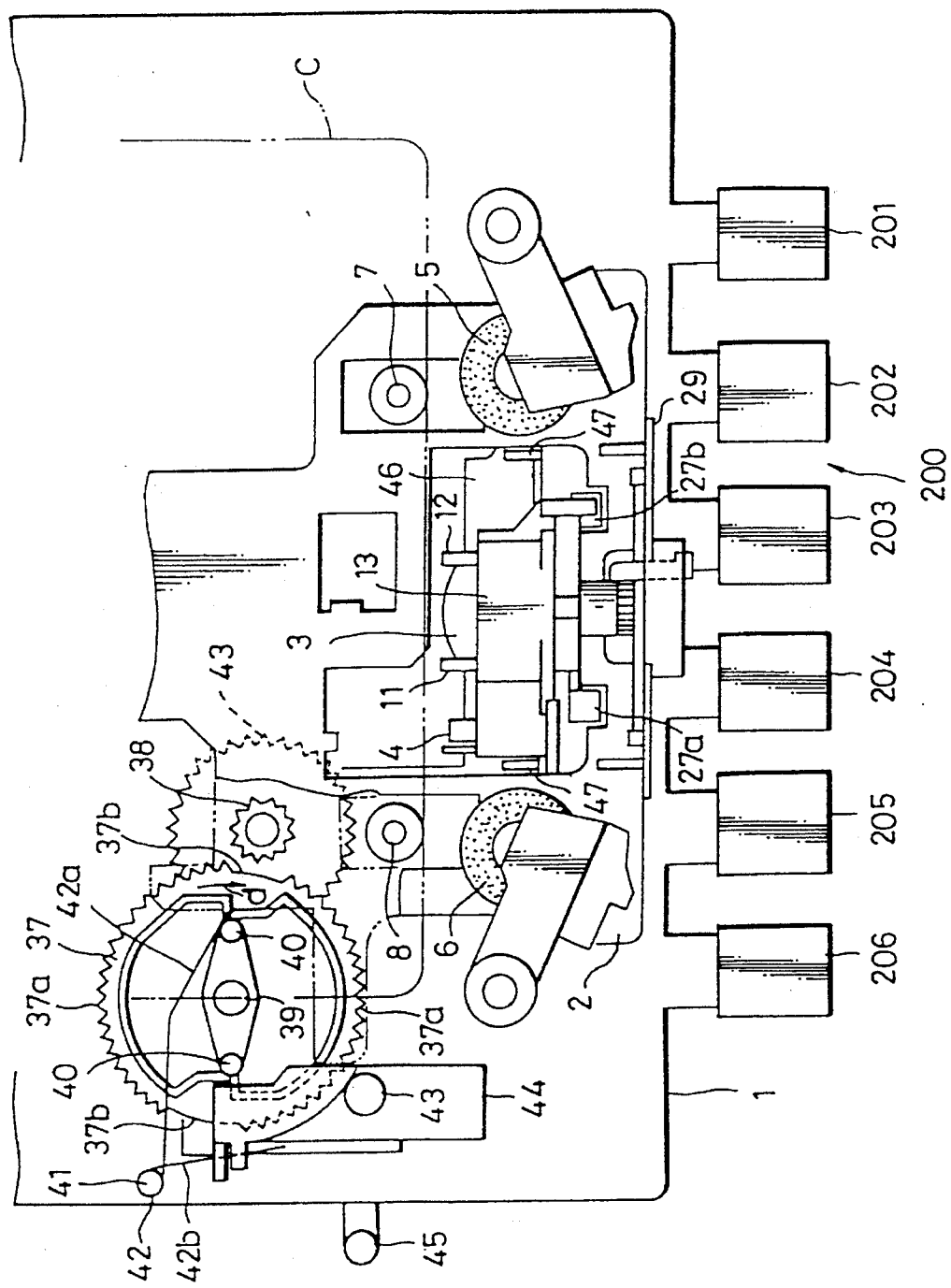
FIG. 1 is a plan view of a main portion of a cassette tape recorder according to an embodiment of the present invention.
Figure 2:
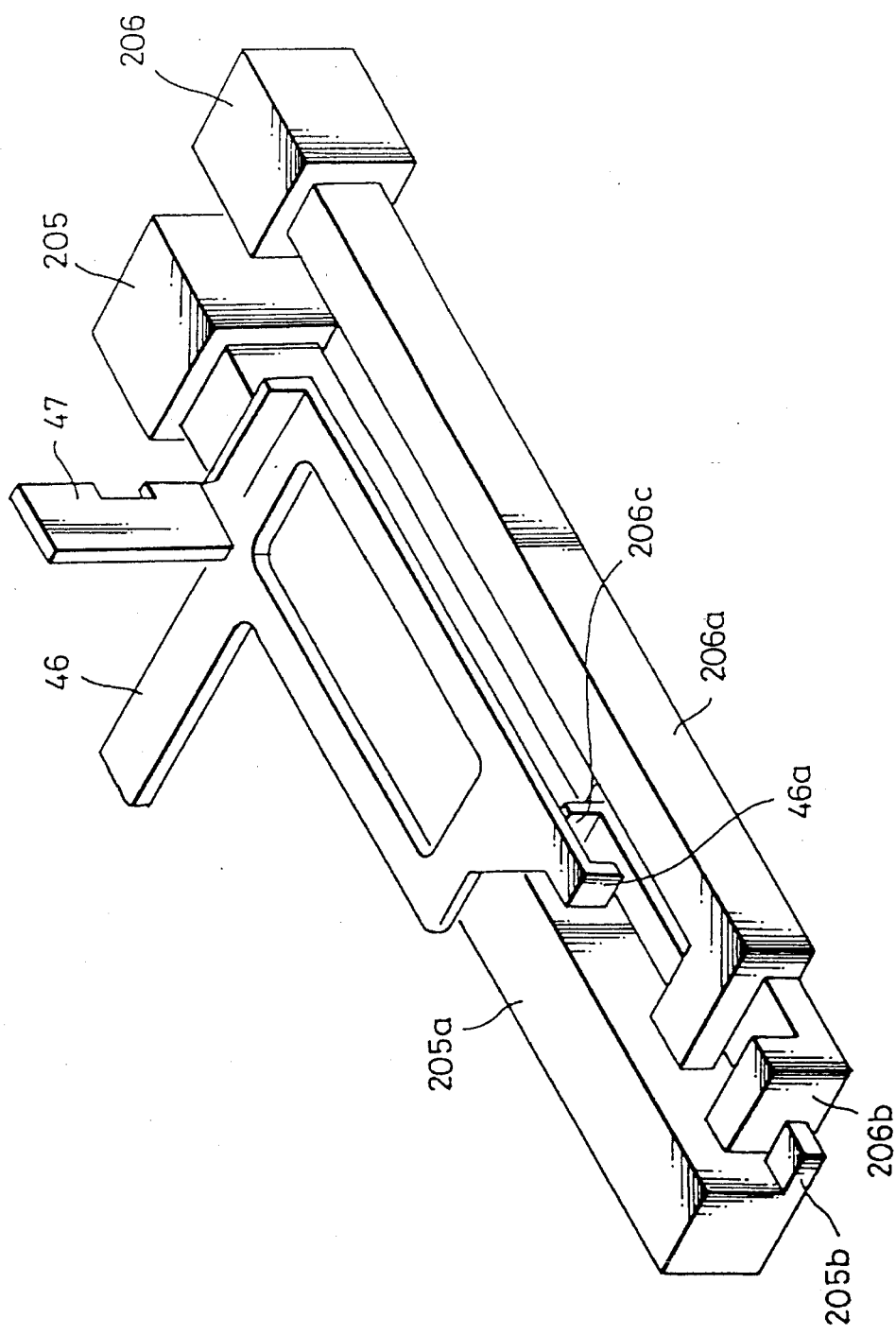
FIG. 2 is a perspective view of a REC (recording) button, a PLAY (play) button and a recording operation slide member.
Figure 3:
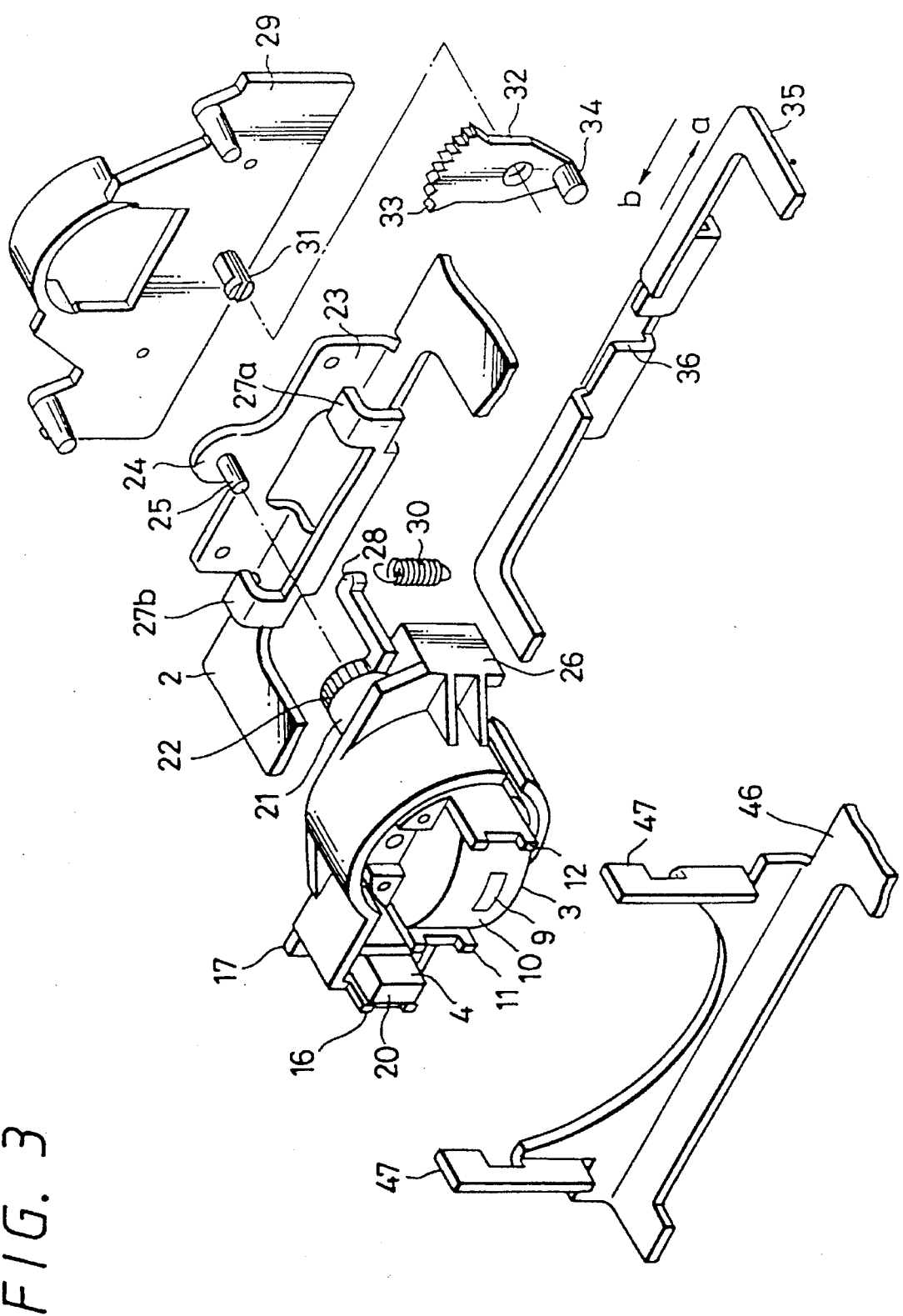
FIG. 3 is an exploded perspective view of a main portion of the cassette tape recorder according to the embodiment of the present invention.
Figure 4:
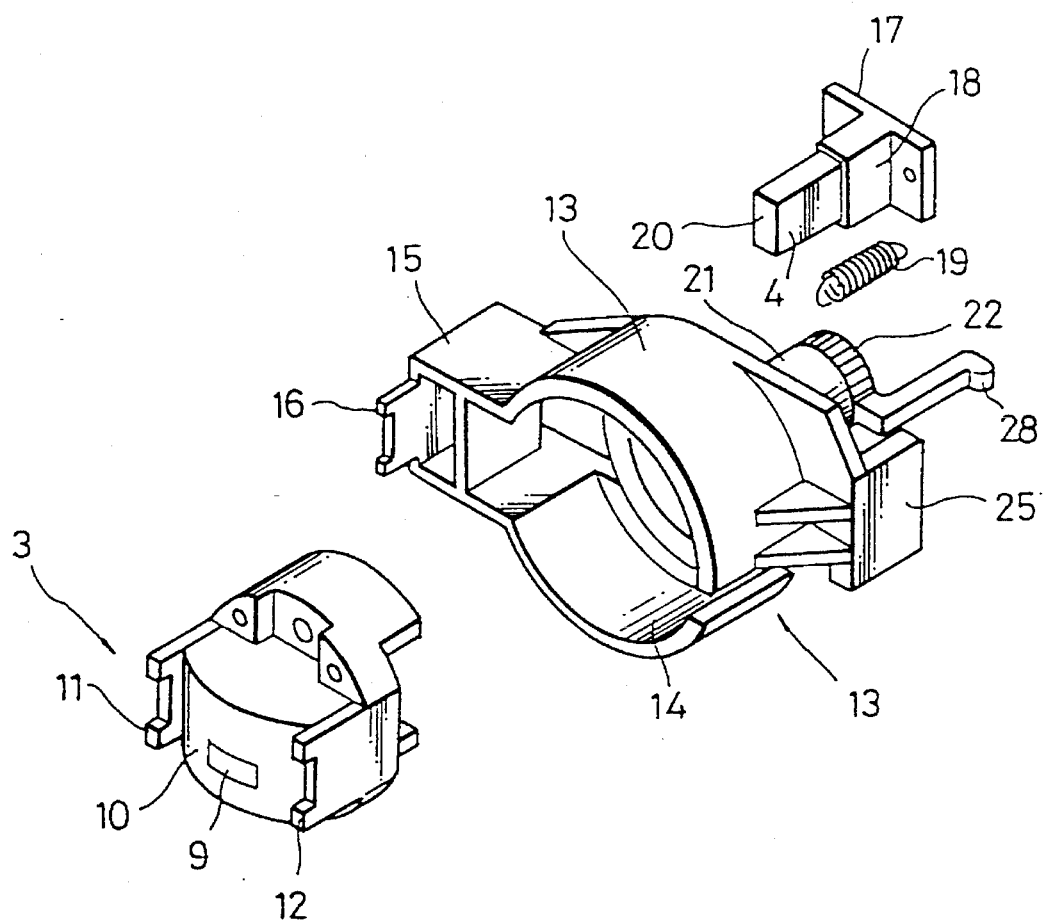
FIG. 4 is an exploded perspective view of a recording and reproducing head and an erase head.

FIG. 1 of the accompanying drawings is a plan view of a recording and reproducing head and an erase head of an auto-reverse cassette tape recorder. FIG. 2 is a perspective view of an interlocking mechanism of a REC (recording) button and a recording operation slide member. FIG. 3 is an exploded perspective view illustrative of the recording and reproducing head, the erase head and main portions of an operation member that operates these heads and a transmission member. FIG. 4 is an exploded perspective view illustrative of the recording and reproducing head and the erase head.

As shown in FIGS. 1, 3 and 4, there is provided a chassis 1 of a cassette tape recorder. An operation portion 200 is outwardly projected from the chassis 1 as shown in FIG. 1. The operation portion 200 includes a stop button 201, a pause button 202 for setting the cassette tape recorder in a pause mode, a fast forward (FF) button 203, a rewind (REW) button 204, a play (PLAY) button 205 and a recording (REC) button 206, in that order from right in FIG. 1 so that they can be freely depressed. The respective buttons 201 through 206 are adapted to set respective drive systems in the driving state via operation levers (not shown).

The respective operation buttons 201 through 206 are engaged with a lock mechanism (not shown) so that they are locked in the depressed state when depressed. The operation lever of the stop button 201 is arranged so as not to be locked and is engaged with the above lock mechanism so as to release other operation levers from the locked state.

The operation lever of the pause button 202 is not engaged with the lock mechanism at all and is operated independently. The pause button 202 is engaged with a well-known push-push mechanism (not shown) disposed on the chassis 1 so that, when depressed once, the pause button 202 is locked in the depressed state thereby temporarily pausing the playback state, for example, and when depressed twice, the pause button 202 is released from the locked state thereby returning the cassette tape recorder to the playback state, for example.

The operation levers of the FF button 203 and the REW button 204 selectively drive a positive-reverse switching mechanism of a high-speed transport system in the positive or opposite direction to thereby transport the tape at high speed in the positive or reverse direction.

The lever of the PLAY button 205 selectively drives a positive and reverse switching mechanism of a tape transport system to thereby transport the tape at constant speed in the positive or reverse direction. Also, the lever of the PLAY button 205 actuates the head slider 2 so that the recording and reproducing head 3 or the like mounted on the head slider 2 is brought in contact with a predetermined surface of the tape. Further, the lever of the PLAY button 205 actuates pinch rollers 5, 6 so that they are selectively brought in contact with a pair of capstans 7, 8, thereby the cassette tape recorder being set in the playback state in the positive or reverse direction.

In order that the recording and reproducing head 3 may reproduce (record) the tape while the tape is transported in the positive direction or in the reverse direction, i.e., while the tape is transported in the forward direction or in the backward direction, an azimuth angle thereof must be made accurate and the recording and reproducing head 3 is reversed by 180° in response to the tape transport direction so that it may come in contact with a corresponding track of the tape. A reverse mechanism of the recording and reproducing head 3 will be described in detail later.

The operation lever of the REC button 206 actuates the recording system so that, when operated in combination with the PLAY button 205, the REC button 206 sets the cassette tape recorder in the recording state in any of the positive and reverse directions or sets the cassette tape recorder so that the cassette tape recorder can record the tape in the positive and reverse directions under the auto-reverse mode. When the REC button 206 is depressed, the recording and reproducing head 3 and the erase head 4 of magnet type that is reversed together with the recording and reproducing head 3 are brought in contact with the corresponding tracks of the tape as will be described later on.

An interlocking mechanism of the REC button 206 and the PLAY button 205 is arranged as shown in FIG. 2. As shown in FIG. 2, the REC button 206 has on an end portion of a lever 206a thereof an operation member 206b that is in contact with a contact member 205b formed on an end portion of a lever 205a of the PLAY button 205. Therefore, when the REC button 206 is depressed, the contact member 205b of the PLAY button 205 is pushed by the operation member 206b, whereby the PLAY button 205 is depressed together with the REC button 206. The REC button 206 has on its lever 206a a hook member 206c. The hook member 206c can be engaged with a hook portion 46a of a recording operation slide member 46, which will be described later on, when the REC button 206 is depressed.

Arrangements of the recording and reproducing head 3 and the erase head 4 and the reverse mechanism thereof will be described next.

As shown in FIGS. 3 and 4, the recording and reproducing head 3 has a signal recording and reproducing head portion 9 shifted on one side of a tape contact surface 10. Tape guides 11, 12 are respectively formed on left and right side portions of the recording and reproducing head 3 along a tape travel direction. The recording and reproducing head 3 is fitted into a head supporting member 14 of a bottomed cylindrical configuration of the head holder 13.

The head holder 13 has a second head supporting member 15 of a square shape integrally formed on one side portion thereof so as to accommodate therein the erase head 4. The second head supporting member 15 has a tape guide 16 formed on an outer top portion thereof. The erase head 4 in this embodiment is of the magnet type and projected under the condition that it is fitted into a holder 18 having a restricting plate 17 formed at the rear end thereof. The erase head 4 is inserted into the second head supporting member 15 so that it can be inserted into and ejected from the second head supporting member 15 from the rear side. The erase head 4 is urged toward the tape contact surface 10 side of the recording and reproducing head 3 under spring force of a spring member 19 extended between the inner end of the restricting plate 17 and the second head supporting member 15. More specifically, the erase head 4 is spring-biased by the spring member 19 so that the restricting plate 17 is brought in contact with the rear end portion of the second head supporting member 15 and a tape contact surface 20 of the erase head 4 is substantially flush with the tape contact surface 10 of the recording and reproducing head 3.

The recording and reproducing head 3 and the erase head 4 can be reversed in the range of 180° by the reverse mechanism. That is, the head holder 13 has on a rear surface center thereof a shaft body 21 that has on its top a gear shaft 22 protrusively provided. The gear shaft 22 is pivotally supported on a shaft 25 projected from a shaft supporting portion 24 of an attachment plate 23 erected from the head slider 2.

The head holder 13 has on its rear surface portion opposite to the second head supporting member 15 a stopper member 26. The stopper member 26 can alternately come in contact with receiving members 27a, 27b that are formed on the head slider 2 at positions symmetrical to the shaft body 21, thereby reversing the head holder 13 in the range of 180°. The head holder 13 can be held at a predetermined position by selectively bringing the stopper member 26 of the head holder 13 in contact with the two receiving members 27a, 27b under the spring force of a coil spring 30 extended between a pin lever 28 rearwardly projected from the shaft body 21 and a head gear base 29 which will be described later on. When the head holder 13 is held at the stop position, the head portion 9 of the recording and reproducing head 3 and the erase head 4 are parallel to the tape travel direction.

The head gear holder 29 is supported on the attachment plate 23 of the head slider 2. A sector wheel 32 is pivotally supported on a shaft portion 31 projected from the head gear holder 29. The sector wheel 32 has a tooth portion 33 that is meshed with the gear shaft 22 of the shaft body 21 of the head holder 13. The sector wheel 32 can be rotated about the shaft portion 31 by sliding a projected portion 34 formed on the lower end thereof by a cut-away portion 36 of a slider 35 that is slid in the directions shown by arrows a (normal direction) and b (reverse direction) in FIG. 3. Therefore, the head holder 13 can be reversed by means of the gear shaft 22 meshed with the gear portion 33.

The slider 35 can be slid by a well-known drive mechanism which comprises a cam gear 37, a transmission gear 38 and a transmission mechanism, not shown. A main arrangement of the drive mechanism will be described with reference to FIG. 1. The cam gear 37 has on its circumferential portion a gear portion 37a. The gear portion 37a has on its part geneva-stop portions 37b, 37b of predetermined width at symmetrical positions across a support shaft 39. The cam gear 37 has on its upper surface two protruded portions 40, 40 projected at symmetrical positions across the supporting shaft 39. One end 42a of a spring member 42 supported on a shaft pin 41 erected from the chassis 1 is urged against one protruded portion 40. The other end 42b of the spring member 42 is urged against the lever 44 rotating about a shaft 48 serving as a fulcrum on the chassis 1.

While the cam gear 37 is urged to rotate in the arrow d direction in FIG. 1 under spring force of the spring member 42, the cam gear 37 is engaged with the lever 44 and locked. The lever 44 is released from being locked to the cam gear 37 by moving a manual operation lever 45 in the arrow c direction in FIG. 5 so that the cam gear 37 is rotated by a predetermined amount in the arrow d direction in FIG. 5 under spring force of the spring member 42.

The transmission gear 38 and a transmission large-diameter gear 43 are pivotally and coaxially supported on the chassis 1 at the position corresponding to one geneva-stop portion 37b of the cam gear 37. The transmission large-diameter gear 43 is rotated by a rotation torque obtained from a pulley rotated by a motor serving as a drive source (not shown).

The head slider 2 has on a rear surface thereof a recording operation slide member 46 that is slid in the tape travel direction when the REC button 206 is depressed. A pair of left and right engagement members 47 are erected from the recording operation slide member 46 to the left and right of the head holder 13.

Figure 5:
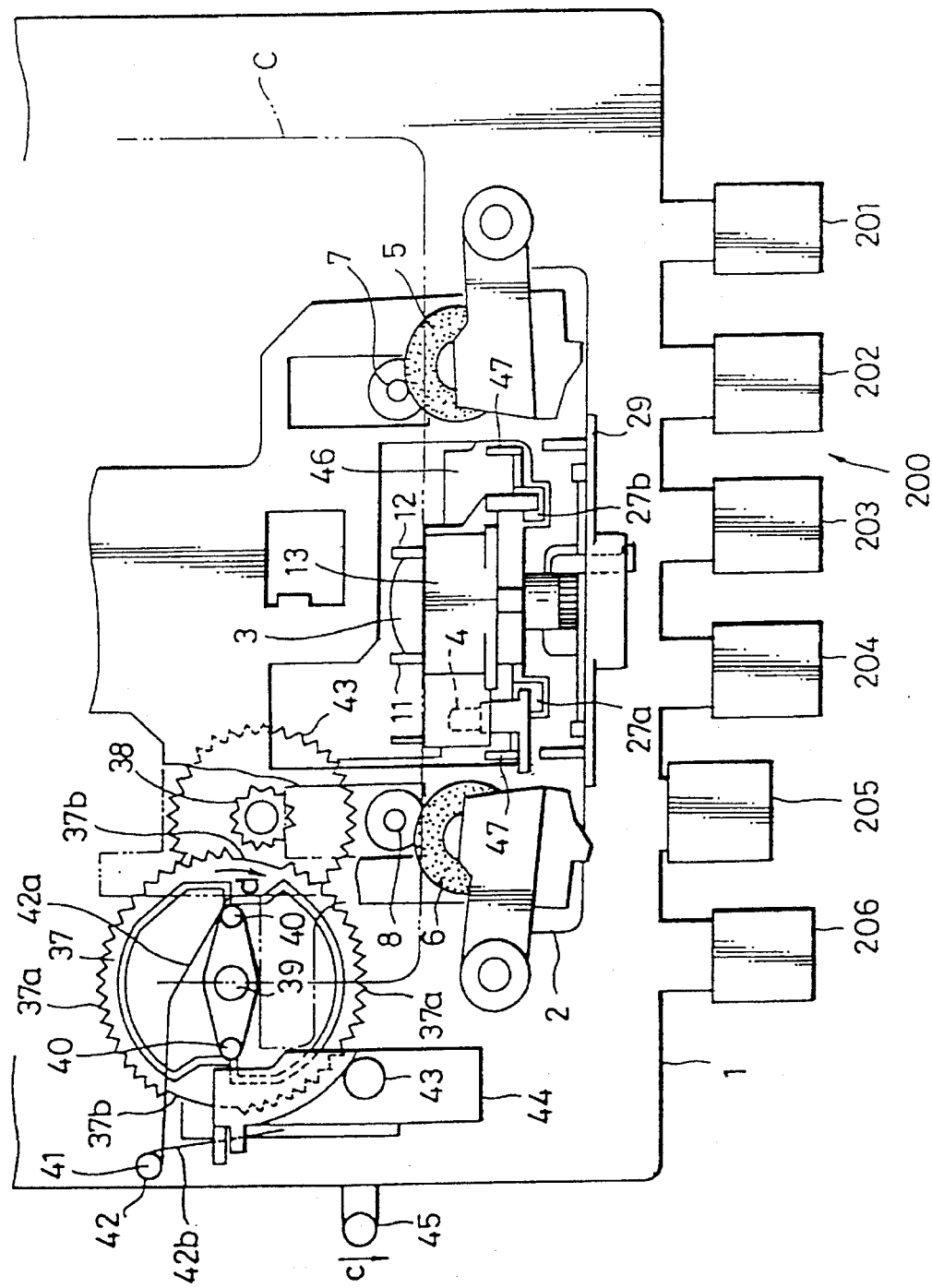
FIG. 5 is a plan view of a main portion of the recording and reproducing apparatus upon playback.
Figure 8A:
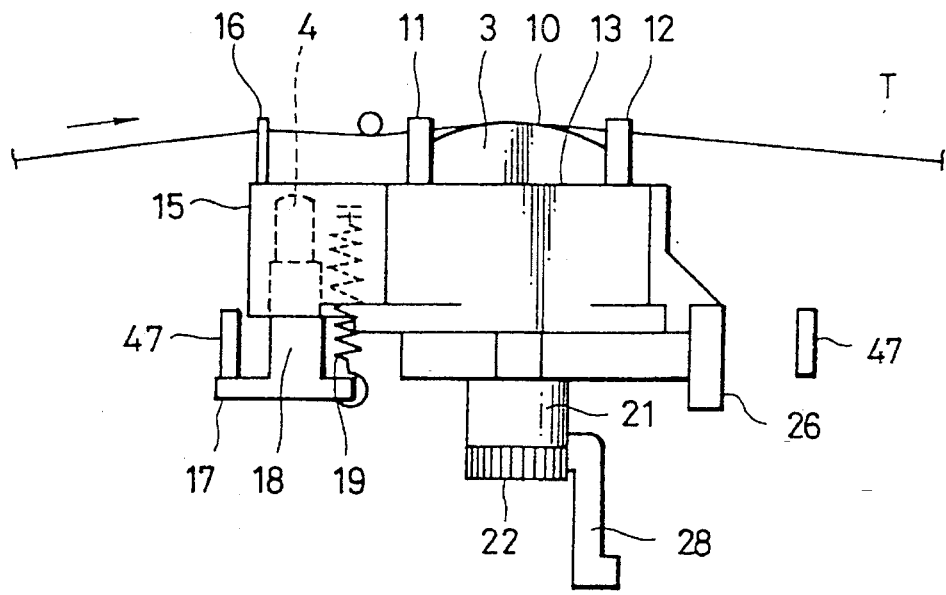
FIGS. 8A and 8B are respectively enlarged plan views of a main portion of the cassette tape recorder when a tape is transported in the normal state and the reverse state upon playback.

Operation of the cassette tape recorder thus arranged according to this embodiment will be described. Playback mode:

FIG. 1 shows the condition that the cassette tape recorder is in the stop condition when the tape is transported in the normal condition. Under this normal condition, if the PLAY button 205 is depressed in order to realize the playback mode as shown in FIG. 5, then the recording and reproducing head 3 is moved to a front tape surface side of a cassette C shown by a phantom line together with the head slider 2 that is slid in unison with the PLAY button 205. On the other hand, since the recording operation slide member 46 is not moved in unison with the PLAY button 205 and is stopped, the restricting plate 17 of the erase head 4 supported on the head holder 13 that is moved together with the recording and reproducing head 3 comes in contact with the engagement members 47 erected on the recording operation slide member 46. Although the recording and reproducing head 3 is moved together with the head holder 13 when the restricting plate 17 and the engagement members 47 are brought in contact with one another, the erase head 4 is inhibited from being moved. Hence, the so-called erase head 4 is substantially moved backwardly from the head holder 13. Therefore, in the playback mode under the normal condition in which the tape T is transported in the positive direction, only the recording and reproducing head 3 is brought in contact with the tape surface located at the front surface of the cassette C shown by a phantom line and the cassette tape recorder is set in the tape loading state under the playback mode. Therefore, the tape T that is being transported under normal condition is not in contact with the erase head 4 as shown in FIG. 8A and is brought in contact with only the tape contact surface 10 of the recording and reproducing head 3. Hence, the tape T is transported in the positive direction (i.e., travels in the forward direction).

When the tape T under the normal condition is reproduced in the positive direction and the tape T is reversed from the position direction to the opposite direction, an auto-reverse mechanism (not shown) is actuated. In this embodiment, a description will be made on the case that the running tape is arbitrarily reversed by the manual operation shown in FIG. 1.

While the tape that was set in the normal condition is reproduced, the transmission gear 38 is rotated by a rotation torque from a tape drive motor (not shown) via the transmission large-diameter gear 43. At that time, the geneva-stop portion 37b of the cam gear 37 is opposed to the transmission gear 38. Consequently, the cam gear 37 is not meshed with the transmission gear 38 and is stopped. When the tape travel direction is reversed while the tape travels, the locked state between the lever 44 and the cam gear 37 is released by moving the manual operation lever 45 in the arrow c direction in FIG. 5, whereby the cam gear 37 is rotated by a predetermined amount in the arrow d direction under spring force of the one end 42a of the spring member 42. Then, the gear portion 37a of the cam gear 37 is meshed with the rotating transmission gear 38, whereby the cam gear 37 is rotated in the arrow d direction in FIG. 5.

Figure 7:
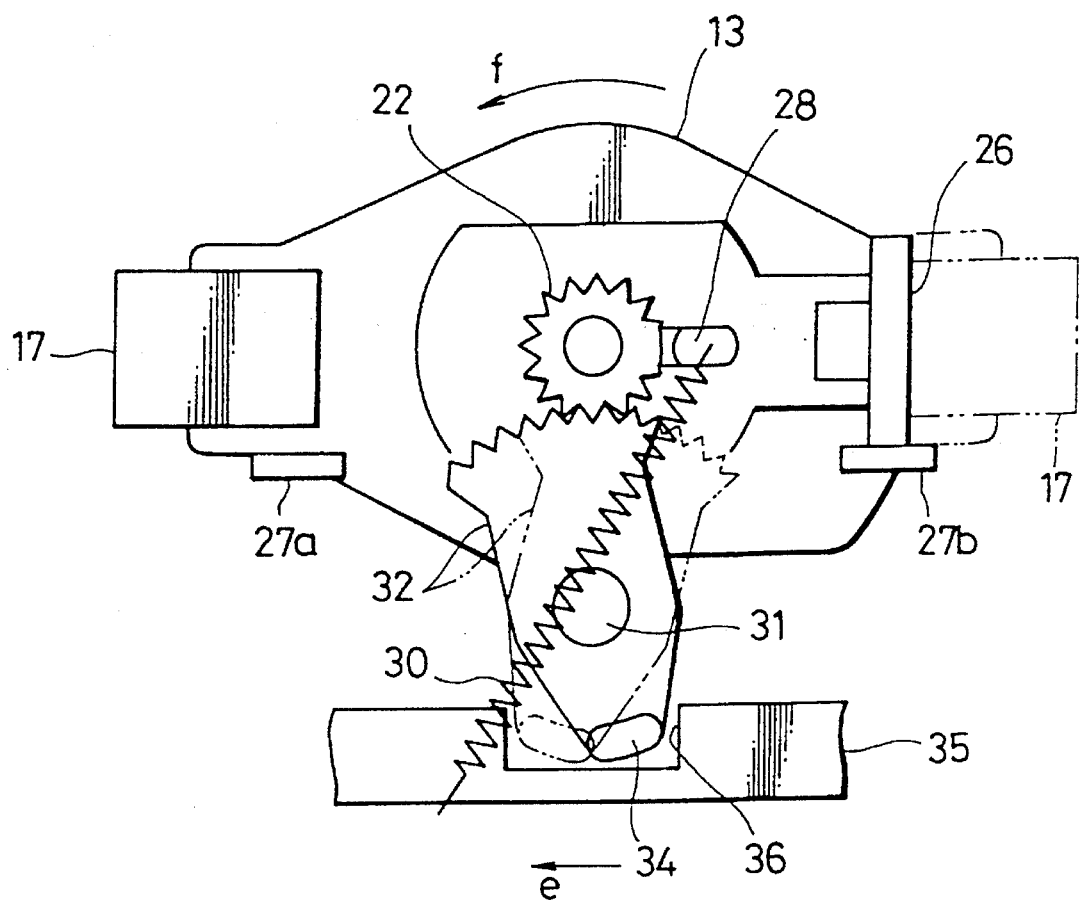
FIG. 7 is a rear view of the condition that a head holder and a sector wheel are meshed with each other.

When the rotation of the cam gear 37 is started, the recording and reproducing head 3 and the pinch rollers 5, 6 are moved backwardly together with the head holder 13 through an interlocking member (not shown) in a ganged relation therewith and then spaced from the tape surface. Simultaneously, the slider 35 is slid in the direction shown by an arrow e in FIG. 7 through a transmission mechanism (not shown) thereby to push the projected portion 34 of the sector wheel 32 engaged with the recessed portion 36. As a result, the sector wheel 32 is rotated about the shaft portion 31 to rotate the head holder 13 and the recording and reproducing head 3 about the shaft 25 in the direction shown by an arrow f in FIG. 7 through the gear portion 22 provided on the head holder 13 meshed with the gear portion 33, whereby the stopper member 26 of the head holder 13 is brought in contact with the receiving member 27b of the head slider 2 and then stopped. That is, the recording and reproducing head 3 is reversed together with the head holder 13 by 180°.

Figure 8B:
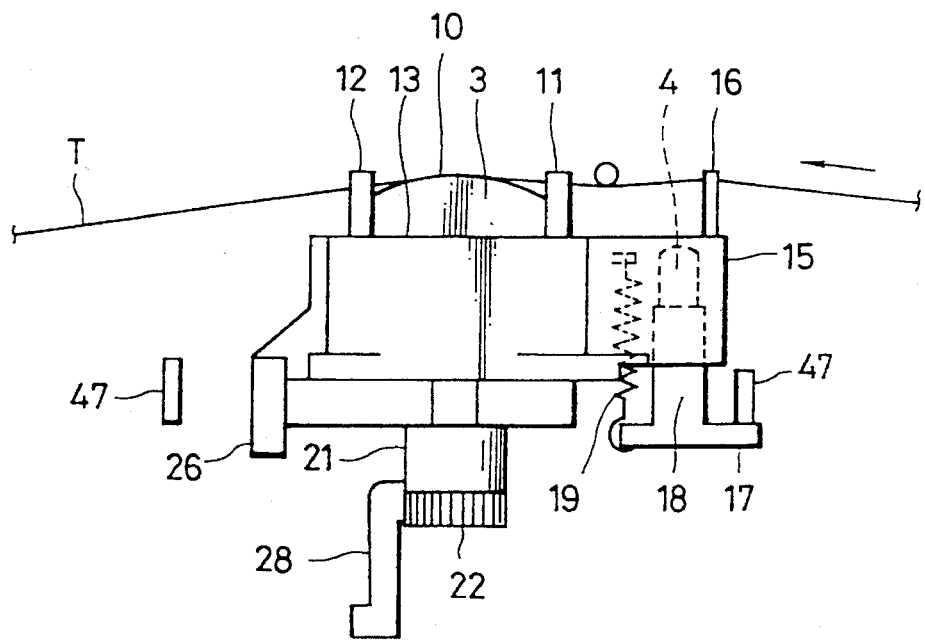

Substantially concurrently with the reverse operation of the recording and reproducing head 3, the recording and reproducing head 3 and the pinch rollers 5, 6 are moved to the surface side of the tape T that is in the positive direction operation (reverse) state and then set in the tape loading state. Therefore, the tape T, which is in the reverse transport state, is transported in the reverse direction while it is not in contact with the erase head 4 but is brought in contact with only the tape contact surface 10 of the recording and reproducing head 3 as shown in FIG. 8B.

Figure 6:
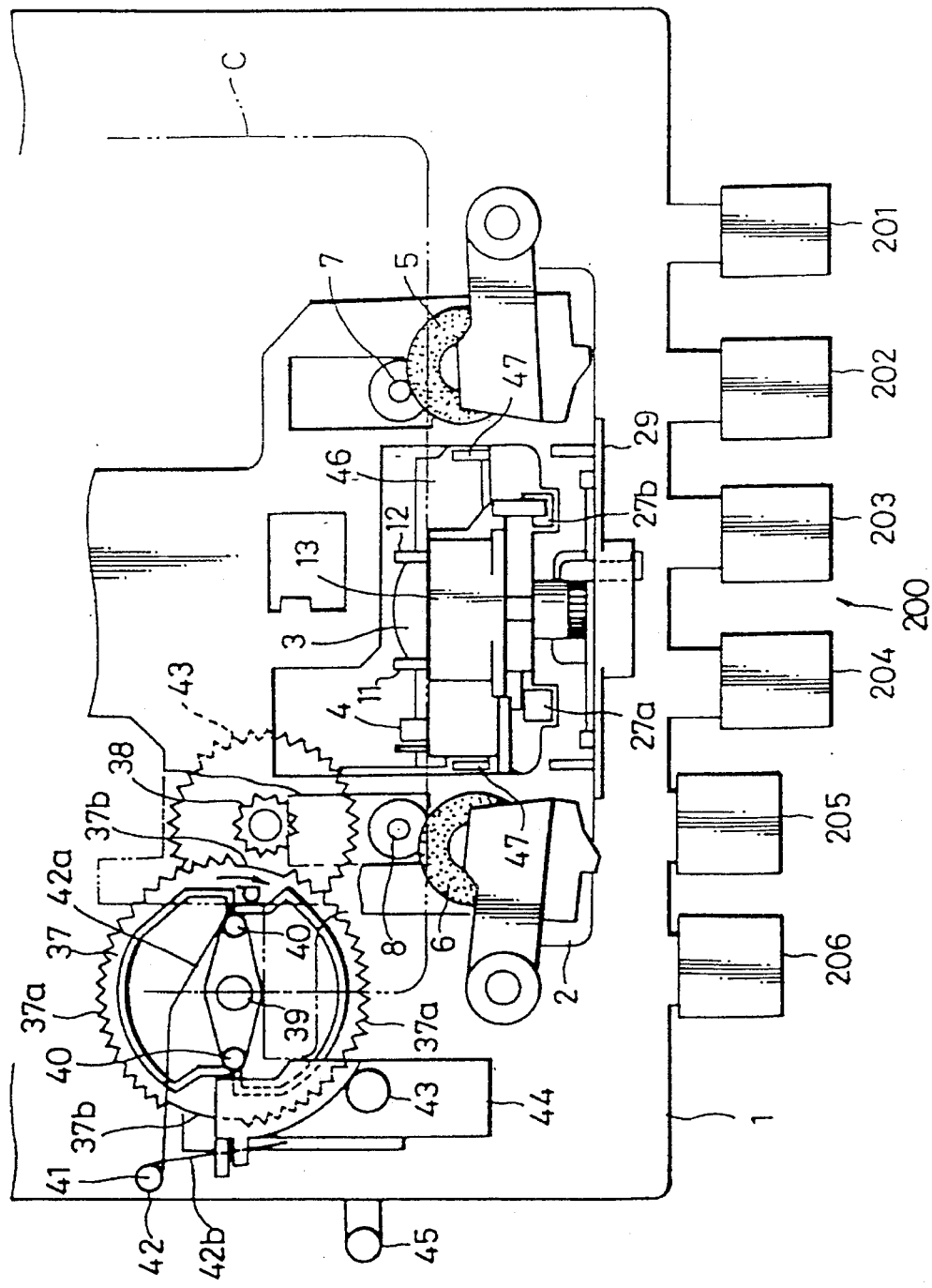
FIG. 6 is a plan view of a main portion of the recording and reproducing apparatus upon recording.
Figure 9A:
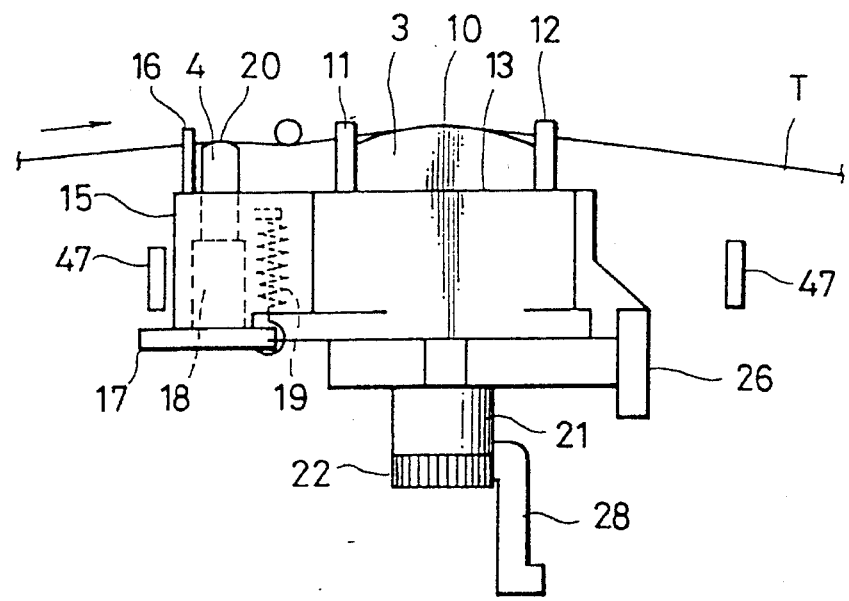
FIGS. 9A and 9B are respectively enlarged plan views of a main portion of the cassette tape recorder when the tape is transported in the normal state and the reverse state upon recording.

Recording mode:

If the play button 205 is depressed together with the REC button 206 in order to set the cassette tape recorder in the recording mode as shown in FIG. 6 under the condition that the cassette tape recorder shown in FIG. 1 is stopped in the normal condition, then the hook member 206c formed on the lever 206a of the REC button 206 is brought in contact with the hook portion 46a of the recording operation slide member 46 and then pulled back, whereby the recording operation slide member 46 is slid together with the head slider 2. More specifically, since the head holder 13 supported on the head slider 2 and the recording and reproducing head 3 are moved and the engagement member 47 vertically provided on the recording and reproducing head 3 also is moved, the erase head 4 supported on the head holder 13 is not brought in contact with the engagement member 47 and moved to the tape surface side of the front surface of the tape cassette C shown by the phantom line. Thus, the cassette tape recorder is set in the loading state upon recording mode. Therefore, the tape T that is in the normal transport state is brought in contact with the tape contact surface 20 of the erase head 4 and then comes in contact with the tape contact surface 10 of the recording and reproducing head 3 sequentially, thereby being transported in the positive direction as shown in FIG. 9A.

Figure 9B:
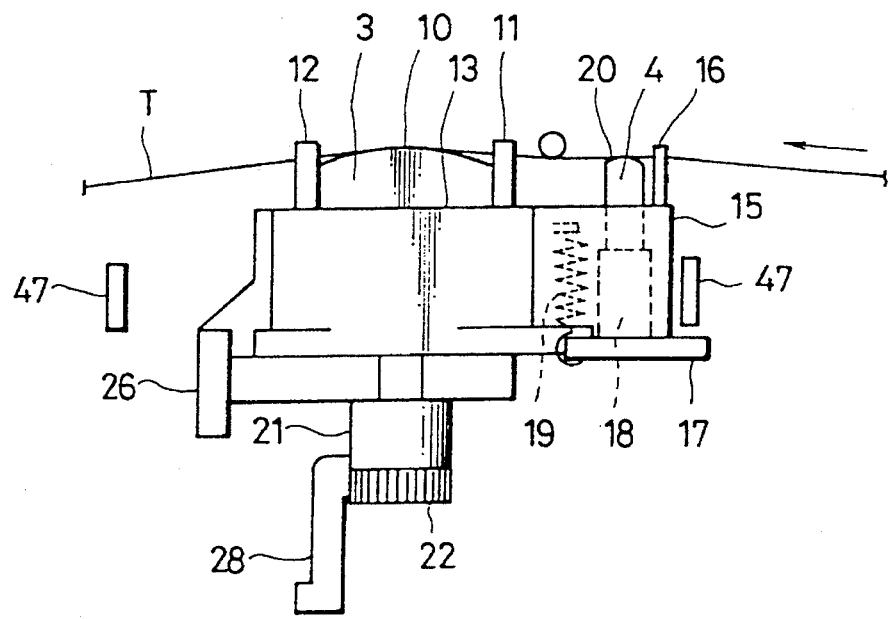

Then, the tape T is transported in the positive direction under the normal condition upon recording. When the tape T is reversed from the positive direction to the reverse direction, the auto-reverse mechanism (not shown) is actuated. Also in this case, as shown in FIG. 9B, the recording and reproducing head 3 and the erase head 4 are reversed similarly to the reproducing mode by the operation of the manual operation lever 45. As a result, the tape T that was set in the reverse transport state is brought in contact with the tape contact surface 10 of the recording and reproducing head 3 sequentially and transported in the reverse direction.

As described above, according to the cassette tape recorder of this embodiment, the recording mode and the reproducing mode in the tape normal transport state and the reverse transport state can be effected by using one erase head 4. In addition, the erase head 4 is made retractable such that it is brought in contact with the tape surface in the recording mode and is inhibited from being brought in contact with the tape surface upon reproduction. The number of erase heads can be minimized and the manufacturing cost of the cassette tape recorder can be reduced.

Further, since one erase head 4 can be utilized in both the tape normal transport state and the reverse transport state, the erase characteristics that the erase head 4 presents when the tape T is transported in the positive direction and in the reverse direction become the same. Also, the number of tape guides can be minimized and the adjustment of tape path becomes easy.

While the sector wheel 32 is rotated by the slide operation of the slider 35 as the reverse mechanism of the recording and reproducing head 3 and the erase head 4 as described above, the present invention is not limited thereto and the sector wheel 32 may be rotated by a plunger, for example.

Further, while the recording and reproducing head in which the recording head and the reproducing head are formed integrally is utilized as described above, the present invention is not limited thereto and the recording head and the reproducing head may be formed separately.

Furthermore, while the cassette tape recorder is utilized as the recording and reproducing apparatus as described above, the present invention is not limited thereto and may be applied to a wide variety of recording and reproducing apparatus.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A recording and reproducing apparatus comprising:

positive and reverse switching means for switching a travel direction of a tape so that said tape is transported at a constant speed in a positive direction or in a reverse direction;

a recording and reproducing head;

an erase head having a restricting plate at an end thereof opposite a tape contact surface of said erase head;

a head slider slidable between a recordable or reproducible first position at which said recording and reproducing head and said erase head are brought in contact with said tape and a second position at which said recording and reproducing head and said erase head are moved away from said tape in a ganged relation with a switching operation of said positive and reverse switching means;

a head supporting member supported on said head slider and including a first head holder and a second head holder for fixedly supporting said recording and reproducing head and for slidably supporting said erase head for motion along a straight line relative to said head supporting member, respectively, so that a tape contact surface of said recording and reproducing head and said tape contact surface of said erase head are projected from said held supporting member;

reverse means for reversing said head supporting member in a ganged relation with the switching operation of said positive and reverse switching means under a condition that said tape contact surfaces of said recording and reproducing head and said erase head are spaced from said tape in an opposing fashion so that said recording and reproducing head and said erase head are reversed at two positions corresponding to positions at which said tape is transported at a constant speed in the positive direction and in the reverse direction;

a record button for setting a recording operation mode;

a record lever attached to said record button; and a recording operation slide member arranged to be moved by said record lever for movement independent of said head slider and slidable only upon engagement with said record lever and including a pair of engagement members erected on said recording operation slide member, wherein one of said pair of engagement members erected on said recording operation slide member is in contact with said restricting plate of said erase head in a reproducing operation mode to hold said tape contact surface of said erase head away from said tape while said recording and reproducing head is in contact with said tape, and said one of said pair of engagement members is moved out of contact with said restricting plate of said erase head in a recording operation mode when a user depresses said record button to cause said record lever to move said recording operation slide member to thereby disengage said one of said pair of engagement members from said restricting plate of said erase head.

2. The recording and reproducing apparatus according to claim 1, further comprising spring-biasing means for spring-biasing said erase head, which is slidably held by said second head holder, in a direction in which the tape contact surface thereof is projected from said head supporting member.

3. The recording and reproducing apparatus according to claim 1, wherein said erase head is made of a magnet.

4. The recording and reproducing apparatus according to claim 1, wherein said head slider is moved from said recordable or reproducible first position to said second position distant from said tape in a ganged relation with the switching operation of said positive and reverse switching means when said head slider is set in said recording or reproducing mode in which said head slider is set at said recordable or reproducible first position.

5. The recording and reproducing apparatus according to claim 1, wherein said recording and reproducing head comprises a recording head and a reproducing head which are formed separately.

* * * * *

UNITED STATES PATENT AND TRADEMARK OFFICE
CERTIFICATE OF CORRECTION

PATENT NO. :     5,481,424
DATED      :     January 02, 1996
INVENTOR(S) :    Shuji Koseki It is certified that error appears in the above-identified patent and that said Letter Patent is hereby corrected as shown below:

Col.1, line 58, after "adjustment" insert --of--

In the claims:

Col.9, line 38, change "held" to --head--

Signed and Sealed this

Sixteenth Day of September, 1997

*Attest:*

BRUCE LEHMAN

*Attesting Officer*     *Commissioner of Patents and Trademarks*